(12) United States Patent
Lee et al.

(10) Patent No.: US 7,336,427 B2
(45) Date of Patent: Feb. 26, 2008

(54) INNER ZOOM LENS SYSTEM

(75) Inventors: Sang Hyuck Lee, Seoul (KR); Ho Seop Jeong, Kyungki-do (KR); Chon Su Kyong, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/281,402

(22) Filed: Nov. 18, 2005

(65) Prior Publication Data

US 2006/0139767 A1  Jun. 29, 2006

(30) Foreign Application Priority Data

Dec. 27, 2004  (KR) .................... 10-2004-0113098

(51) Int. Cl.
*G02B 15/14* (2006.01)
(52) U.S. Cl. .................... 359/686; 359/682
(58) Field of Classification Search ............. 359/680, 359/682, 683, 686
See application file for complete search history.

(56) References Cited

U.S. PATENT DOCUMENTS 5,715,097 A    2/1998  Shibayama et al.
2004/0130647 A1 * 7/2004  Kuba ..................... 348/335

FOREIGN PATENT DOCUMENTS

JP          63281113 A  * 11/1988

* cited by examiner

*Primary Examiner*—Ricky Mack
*Assistant Examiner*—William C Choi
(74) *Attorney, Agent, or Firm*—Lowe Hauptman Ham & Berner

(57) ABSTRACT

An inner zoom lens system for use in a camera module having an image sensor and appropriate for an inner-focus type is provided. The inner zoom lens system includes, sequentially from an object side, a first lens group, a second lens group, a third lens group, and a fourth lens group. The first lens group is fixed and has minus refractive power. The second lens group has plus refractive power and performs a zooming operation by moving such that an interval between the first and the second lens groups is reduced when zooming from a wide angle end to a telephoto end. The third lens group has minus refractive power and moves such that a position of an image plane is corrected depending the zooming due to the movement of the second lens group. The fourth lens group has plus refractive power.

10 Claims, 6 Drawing Sheets

INNER ZOOM LENS SYSTEM

RELATED APPLICATION

The present application is based on, and claims priority from, Korean Application Number 2004-0113098, filed Dec. 27, 2004, the disclosure of which is hereby incorporated by reference herein in its entirety.

BACKGROUND OF THE INVENTION

1. Field of the Invention

The present invention relates to a zoom lens system, and more particularly, to an inner zoom lens system for use in an image-pickup camera module having an image sensor and which is appropriate for an inner-focus type.

2. Description of the Related Art

In a focusing system of a zoom lens, a front-focus type for moving a first lens group closest to an object side is generally used.

Since in the front-focus type a movement amount of the first lens group required for focusing an object positioned at the same distance does not depend on a focal length, the front-focus type is widely used.

However, since the front-focus type moves the first lens group which is relatively big and heavy to perform focusing, the front-focus type has a disadvantage that a focusing speed is slow in performing auto-focus.

Further, a plurality of lenses are generally used to obtain excellent optical characteristics such as a high resolution, thus a camera module gets big in its size and difficult to mount on a portable apparatus. Still further, since the first lens group is moved to the outside when zooming is performed, the front-focus type has a problem in applying to a portable apparatus.

Another further, since the first lens group is moved to the outside, use of the front-focus type cannot be properly applied to the cases where there is limitation in moving a lens to the outside such as a mobile phone or an outside space is limited.

In the meantime, for another focusing system of a zoom lens, there is a rear-focus type for moving a lens of an image plane side.

The rear-focus type has a problem that a movement amount of a focusing lens required for focusing an object positioned at the same distance is varied depending on a zooming position and that a focus is lost when zooming is performed after a close distant object is once focused.

To improve such problems, a zoom lens system which uses a small combination of lenses and can be manufactured in a small size while realizing a high resolution and a sufficient zooming performance, is required.

SUMMARY OF THE INVENTION

Accordingly, the present invention is directed to an inner zoom lens system that substantially obviates one or more problems due to limitations and disadvantages of the related art.

An object of the present invention is to provide an inner zoom lens system of an inner-focus type capable of realizing a high resolution and a sufficient zooming performance simply using a small lens combination and which can be manufactured in a small size.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an inner zoom lens system, which includes: a first lens group fixed and having minus refractive power; a second lens group having plus refractive power and performing a zooming operation by moving such that an interval between the first lens group and the second lens group is reduced when zooming from a wide angle end to a telephoto end; a third lens group having minus refractive power and moving such that a position of an image plane is corrected depending on the zooming due to movement of the second lens group; and a fourth lens group fixed and having plus refractive power.

The zoom lens system satisfies following Equations 1 to 4 regarding refractive power of each lens group, satisfies following Equation 5 regarding a measure of an optical axis direction of the entire lens system, and satisfies Equation 6 regarding effective focal lengths at a wide angle end and a telephoto end.

$$0.5 < |f_I|/f_W < 2.0 \quad \text{Equation 1}$$

$$0.3 < f_{II}/f_W < 1.0 \quad \text{Equation 2}$$

$$0.2 < |f_{III}|/f_W < 1.5 \quad \text{Equation 3}$$

$$0.5 < f_{IV}/f_W < 3.0 \quad \text{Equation 4}$$

$$TL/d < 3.0 \quad \text{Equation 5}$$

$$f_T/f_W \geq 2.0 \quad \text{Equation 6}$$

where, $f_I$: effective focal length of first lens group ($f_I < 0$)
$f_{II}$: effective focal length of second lens group
$f_{III}$: effective focal length of third lens group ($f_{III} < 0$)
$f_{IV}$: effective focal length of fourth lens group
$f_W$: effective focal length of entire lens system at wide angle end
$f_T$: effective focal length of entire lens system at telephoto end
d: diagonal length of image sensor that corresponds to image-forming plane
TL: distance from refractive plane at object side of first lens group up to image plane Lenses for use in the first to the fourth lens groups may consist of four to six lens combinations.

The lens for use in the third lens group may be made of material whose refractive index is 1.7 or more and whose abbe number is 30 or less.

In another aspect of the present invention, there is provided an inner zoom lens system, which includes: a first lens group fixed and having minus refractive power; a second lens group having plus refractive power and performing a zooming operation by moving such that an interval between the first lens group and the second lens group is reduced when zooming from a wide angle end to a telephoto end; a third lens group having only one lens of minus refractive power and moving such that a position of an image plane is corrected depending on the zooming due to movement of the second lens group; a fourth lens group fixed and having only one lens of plus refractive power; and an image sensor for sensing a formed image from the fourth lens group, a total lens combination for use in the first to the fourth lens groups being six or less.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
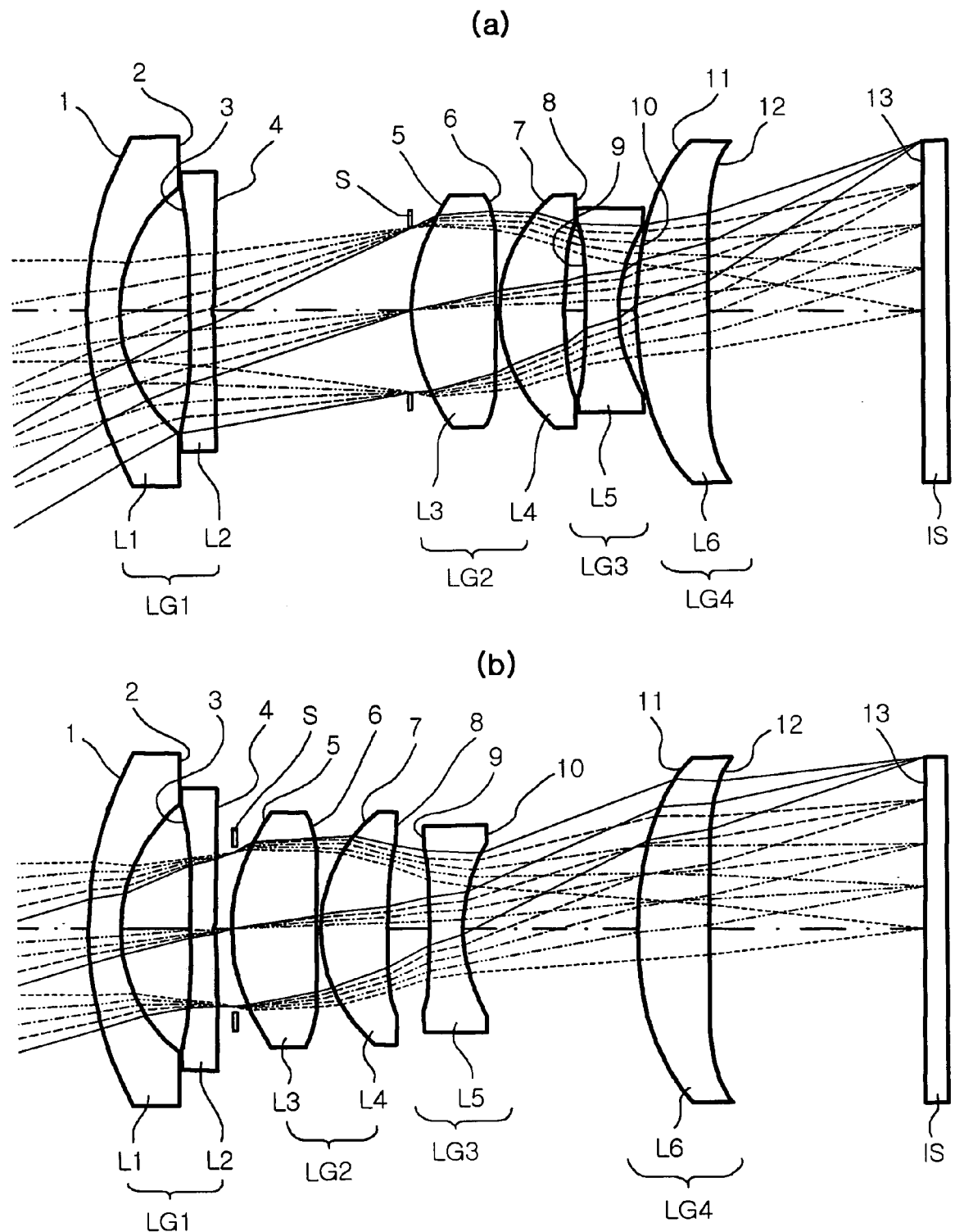
FIG. 1 is a view illustrating a lens construction of an inner zoom lens system according to a first embodiment of the present invention, in which (a) and (b) represent a lens construction at a wide angle end and a lens construction at a telephoto end, respectively.

FIG. 1 is a view illustrating a lens construction of an inner zoom lens system according to a first embodiment of the present invention. A thickness, a size, and a shape of a lens have been exaggerated more or less in the following lens construction, and shapes of the spherical and the aspherical surfaces suggested by the drawings have been suggested for an example purpose only and not limited to those shapes.

Generally, a camera module includes: at least one lens; a housing having a predetermined space formed in its inside to receive the lens; an image sensor that corresponds to an image-forming plane of the lens; and a circuit board fixedly installed to one end of the housing and mounting the image sensor on its one surface so as to process the image sensed by the image sensor.

As illustrated in FIG. 1, the inner zoom lens system of the present invention includes, sequentially from an object side: a first lens group LG1 fixed and having minus refractive power; a second lens group LG2 having plus refractive power and performing a zooming operation by moving such that an interval between the first lens group LG1 and the second lens group LG2 is reduced when zooming from a wide angle end to a telephoto end; a third lens group LG3 having minus refractive power and moving such that a position of an image plane is corrected depending on the zooming due to the movement of the second lens group LG2; and a fourth lens group LG4 fixed and having plus refractive power.

At this point, the first lens group LG1 having weak minus refractive power and the fourth lens group LG4 having weak plus refractive power are fixed. The second lens group LG2 having strong plus refractive power performs a zooming operation by moving such that the interval between the first lens group LG1 and the second lens group LG2 is reduced when zooming from a wide angle end to a telephoto end. The third lens group LG3 having strong minus refractive power moves so as to compensate a position of an image plane depending on the zooming due to the movement of the second lens group LG2.

That is, since the first lens group LG1 has minus refractive power and diverges light, the second lens group LG2 is so configured as to have plus refractive power and to reduce the interval between the first lens group LG1 and the second lens group LG2 when zooming from a wide angle end to a telephoto end. The third lens group LG3 is moved to a first lens group side.

Further, lenses for use in the third lens group LG3 are made of optical material whose refractive index is 1.7 or more and whose abbe number is 30 or less so as to correct a chromatic aberration of the lens system.

In the meantime, an optical filter including an infrared filter (IF), a cover glass (CG) may be provided to a rear of the fourth lens group LG4. In principle, the optical filter does not have an influence on optical characteristics of the present invention.

Further, the image sensor (IS) includes a charged coupled device (CCD) and a complementary metal oxide semiconductor (CMOS) and is arranged behind the fourth lens group LG4 that corresponds to an image plane (photosensitive plane) 13 for receiving an image formed by the lens.

Under the above-described entire construction, operation effects of following Equations 1 to 6 will be described.

The inner zoom lens system of the present invention can realize a high resolution and a sufficient zooming performance and a small size simply using a small lens combination by satisfying following Equations 1 to 4 regarding the refractive power of each lens group.

$$0.5 < |f_I|/f_W < 2.0 \quad \text{Equation 1}$$

$$0.3 < f_{II}/f_W < 1.0 \quad \text{Equation 2}$$

$$0.2 < |f_{III}|/f_W < 1.5 \quad \text{Equation 3}$$

$$0.5 < f_{IV}/f_W < 3.0 \quad \text{Equation 4}$$

where, $f_I$: effective focal length of first lens group ($f_I < 0$)
$f_{II}$: effective focal length of second lens group
$f_{III}$: effective focal length of third lens group ($f_{III} < 0$)
$f_{IV}$: effective focal length of fourth lens group
$f_W$: effective focal length of entire lens system at wide angle end Equation 1 prescribes refractive power of the first lens group LG1. If the value exceeds an upper limit and the minus refractive power is weakened, aberration correction is difficult and a movement amount of the first lens group due to focusing is increased and aberration variation gets severe in case of a small F-number. On the contrary, if the value goes below a lower limit and the minus refractive power is strengthened, corrections of a distortion aberration and a spherical aberration are difficult.

Equation 2 prescribes refractive power of the second lens group LG2. If the value exceeds an upper limit and the plus refractive power is weakened, a movement amount of the second lens group LG2 working in cooperation with the zooming operation is increased and a size of a lens gets big, which are disadvantageous in viewpoint of a small sizing. On the contrary, if the value goes below a lower limit and the plus refractive power is strengthened, aberration correction is difficult.

Equation 3 prescribes refractive power of the third lens group LG3. If the value goes below a lower limit and the minus refractive power is strengthened, aberration generation amount is increased and aberration correction is difficult. If the value exceeds an upper limit and the minus refractive power is weakened, a movement amount of the third lens group LG3 is increased upon zooming, so that small-sizing of the lens system is difficult.

Equation 4 prescribes refractive power of the fourth lens group LG4. If the value goes below a lower limit and the plus refractive power gets big, aberration generation amount is increased. If the value exceeds an upper limit and the plus refractive power gets small, a total length of the lens system is lengthened.

Further, the inner zoom lens system satisfies following Equation 5 regarding a measure in an optical axis direction of the entire lens system.

$$TL/d < 3.0 \qquad \text{Equation 5}$$

where, d: diagonal length of image sensor that corresponds to image-forming plane TL: distance from refractive plane at object side of first lens group up to image plane Equation 5 prescribes a length of the entire lens system and is a requirement related to a small-sizing characteristics. If the value exceeds an upper limit in Equation 5, it is advantageous in viewpoint of aberration correction but contradictory to a small-sizing which is a primary characteristics of the present invention.

Further, the inner zoom lens system satisfies following Equation 6 regarding effective focal lengths at a wide angle end and a telephoto end.

$$f_T/f_W \geq 2.0 \qquad \text{Equation 6}$$

where, $f_W$: effective focal length of entire lens system at wide angle end $f_T$: effective focal length of entire lens system at telephoto end Equation 6 prescribes a zoom ratio of the lens system. If the value goes below a lower limit and the zoom ratio gets small, a function as a zoom lens system is deteriorated.

Numerical embodiments of the present invention will be now described in detail.

As described above, the following first and second embodiments all include, sequentially from an object side: a first lens group LG1 fixed and having minus refractive power; a second lens group LG2 having plus refractive power and performing a zooming operation by moving such that an interval between the first lens group LG1 and the second lens group LG2 is reduced when zooming from a wide angle end to a telephoto end; a third lens group LG3 having minus refractive power and moving such that a position of an image plane is corrected depending on the zooming due to the movement of the second lens group LG2; and a fourth lens group LG4 fixed and having plus refractive power.

Further, an aperture stop S is provided between the first lens group LG1 and the second lens group LG2. An image sensor (IS) that corresponds to an image plane is arranged behind the fourth lens group LG4.

An aspherical surface used in each of the following embodiments is obtained by the following known formula 1 and 'E and a number following the E' used in conic constants K and aspherical coefficients A, B, C, and D represent a 10's power. For example, E+12 and E−04 represent $10^{12}$ and $10^{-4}$, respectively.

$$Z = (Y^2/r)[1+\sqrt{1-(1+K)(Y/r)^2}]+AY^4+BY^6+CY^8+DY^{10}$$

Z: distance toward an optical axis from a vertex of a lens

Y: distance toward a direction perpendicular to an optical axis r: radius of curvature on a vertex of a lens K: conic constant A,B,C, and D: aspherical coefficients

FIRST EMBODIMENT

The following table 1 represents numerical examples according to a first embodiment of the present invention.

Figure 2:
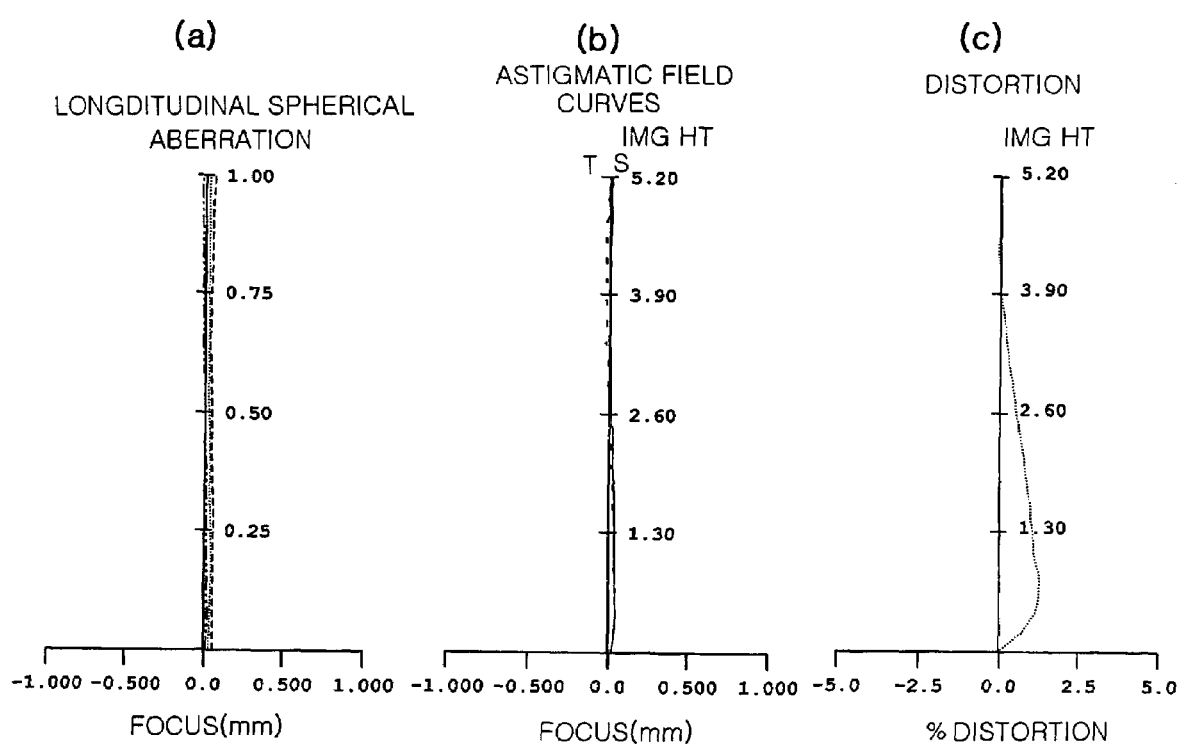
FIG. 2 is a graph explaining aberrations at a wide angle end of the first embodiment shown in FIG. 1, in which (a), (b), and (c) represent a spherical aberration, astigmatism, and distortion, respectively.
Figure 3:
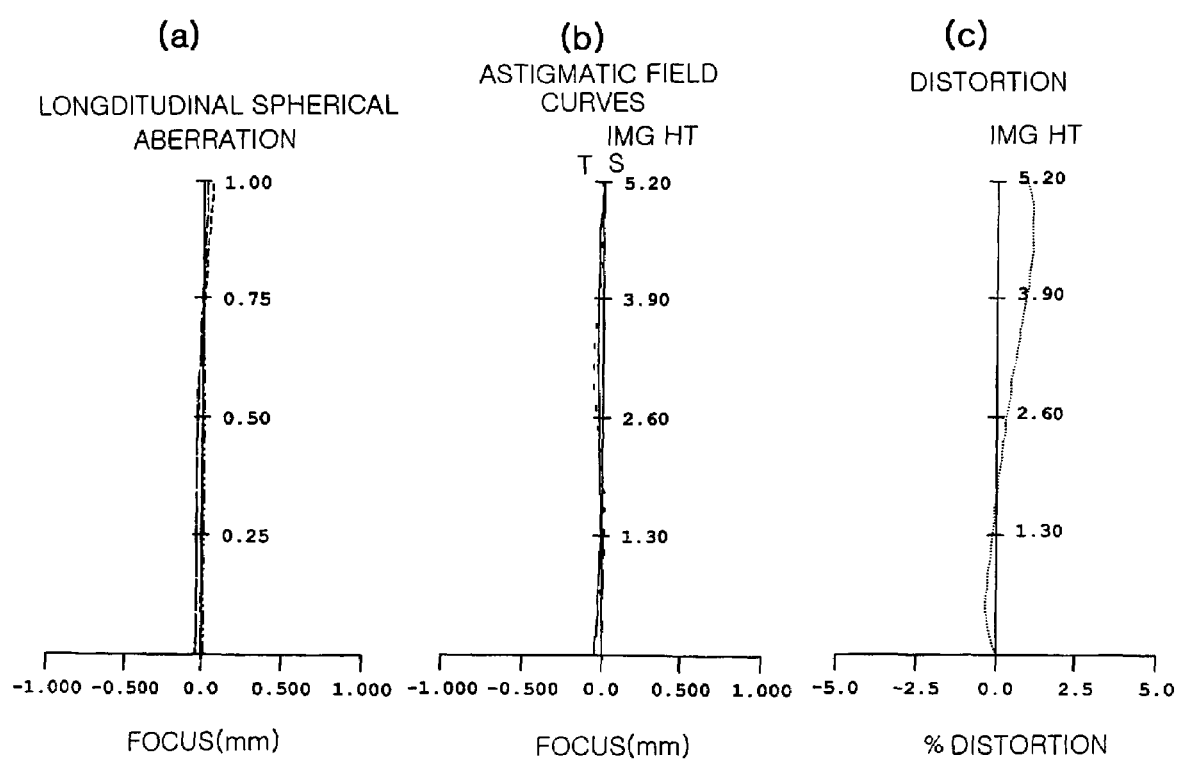
FIG. 3 is a graph explaining aberrations at a telephoto end of the first embodiment shown in FIG. 1, in which (a), (b), and (c) represent a spherical aberration, astigmatism, and distortion, respectively.

Further, FIG. 1(a) is a view of a lens construction illustrating a lens arrangement at a wide angle end in an inner zoom lens system according to the first embodiment of the present invention, FIG. 1(b) is a view of a lens construction illustrating a lens arrangement at a telephoto end, FIG. 2(a) to 2(c) illustrate a spherical aberration, astigmatism, and distortion, respectively, at a wide angel end of the lens system illustrated in Table 1 and FIG. 1. FIG. 3(a) to 3(c) illustrate a spherical aberration, astigmatism, and distortion, respectively, at a telephoto end of the lens system illustrated in Table 1 and FIG. 1.

Referring to FIG. 1, according to the first embodiment of the present invention, a first lens group LG1 consists of a first lens L1 which is a negative meniscus lens convex toward an object side and a second lens L2 concaved on its both sides. The second lens group LG2 consists of a third lens L3 that is convex on its both sides and a fourth lens L4 which is a positive meniscus lens convex toward an object side. The third lens group LG3 consists only of a fifth lens L5 concaved on its both sides. The fourth lens group LG4 consists only of a sixth lens L6 having plus refractive power.

Further, in the following graph illustrating astigmatism, "S", "T" represent sagittal, tangential, respectively.

According to the first embodiment, an effective focal length $f_w$ of the entire lens system at a wide angle end is 8.5 mm and an effective focal length $f_T$ of the entire lens system at a telephoto end is 17.0 mm. An effective focal length $f_I$ of the first lens group LG1 is −7.45 mm, an effective focal length $f_{II}$ of the second lens group LG2 is 3.36 mm, and effective focal length $f_{III}$ of the third lens group LG3 is −1.79 mm, and an effective focal length $f_{IV}$ of the fourth lens group LG4 is 8.66 mm.

Further, F-number $F_{No}$ is 2.8 at a wide angle end, 4.3 at a telephoto end, and an entire angle of view 2ω is 62° at a wide angle end, 34° at a telephoto end. A total length (TL) from the first lens L1 of the first lens group LG1 to an image plane (IP) is 25.0 mm. A diagonal length of the image sensor (IS) is 10 mm.

TABLE 1

| Plane No. | Radius of curvature R (mm) | Plane interval t (mm) | Refractive index $n_d$ | Abbe number $V_d$ | Remark |
|---|---|---|---|---|---|
| 1 | 11.0100 | 1.0000 | 1.487 | 70.4 | 1st lens |
| 2 | 4.7950 | 2.1300 | — | — | |
| *3 | −10.7970 | 0.7000 | 1.529 | 55.4 | 2nd lens |
| *4 | 23.2630 | ✕·variable 1 | — | — | |
| *5 | 5.7820 | 2.5392 | 1.487 | 70.4 | 3rd lens |
| *6 | −3.7530 | 0.1000 | — | — | |
| *7 | 4.5350 | 1.9717 | 1.592 | 68.3 | 4th lens |
| *8 | 30.3950 | ✕·variable 2 | — | — | |
| *9 | −2.1360 | 0.9975 | 1.755 | 27.5 | 5th lens |
| *10 | 4.5950 | ✕·variable 3 | — | — | |
| *11 | 13.3980 | 2.0741 | 1.625 | 35.5 | 6th lens |
| *12 | −8.6530 | 6.4679 | — | — | |
| 13 | ∞ | — | — | — | Image plane |

In Table 1, ✕ represents a refraction plane whose inter-plane interval is varied upon zooming. The inter-plane intervals at a wide angle end and at a telephoto end are given by Table 2 below.

TABLE 2

| | Wide angle end (mm) | Telephoto end (mm) |
|---|---|---|
| Variable 1 | 0.5301 | 5.2368 |
| Variable 2 | 5.9101 | 0.5000 |
| Variable 3 | 0.5794 | 1.2828 |

In Table 1, ★ represents an aspherical surface and Conic constants K and aspherical coefficients A, B, C, and D by the formula 1 are given by Table 3 as follows.

TABLE 3

| Plane No. | K | A | B | C | D |
|---|---|---|---|---|---|
| 3 | −1.0633E+24 | −2.6038E−03 | 1.2676E−04 | −4.9714E−06 | 1.3610E−07 |
| 4 | −1.0161E+00 | −2.4984E−03 | 1.5376E−04 | −7.0298E−06 | 2.0348E−07 |
| 5 | 1.0955E−01 | 5.5745E−03 | −1.9698E−04 | −3.1409E−06 | −1.6930E−07 |
| 6 | −9.5323E+21 | −1.3387E−04 | −1.4083E−04 | −6.0112E−06 | 2.8832E−07 |
| 7 | −3.9884E−01 | 7.2837E−03 | −7.8767E−05 | 3.6664E−06 | −2.0472E−07 |
| 8 | 9.4576E+01 | 1.6469E−03 | 1.8853E−04 | | |
| 9 | −1.3635E+14 | −4.0201E−03 | −2.2835E−05 | 5.5840E−06 | |
| 10 | 6.3167E−01 | −2.8046E−03 | 1.8877E−05 | −1.3947E−05 | |
| 11 | −4.2785E+01 | 2.1247E−03 | −5.4964E−05 | 1.1332E−06 | |
| 12 | −3.8393E+12 | 8.8011E−05 | 7.4748E−05 | −3.8909E−06 | 8.6198E−08 |

SECOND EMBODIMENT

Table 4 below represents a numerical example according to a second embodiment of the present invention.

Figure 4:
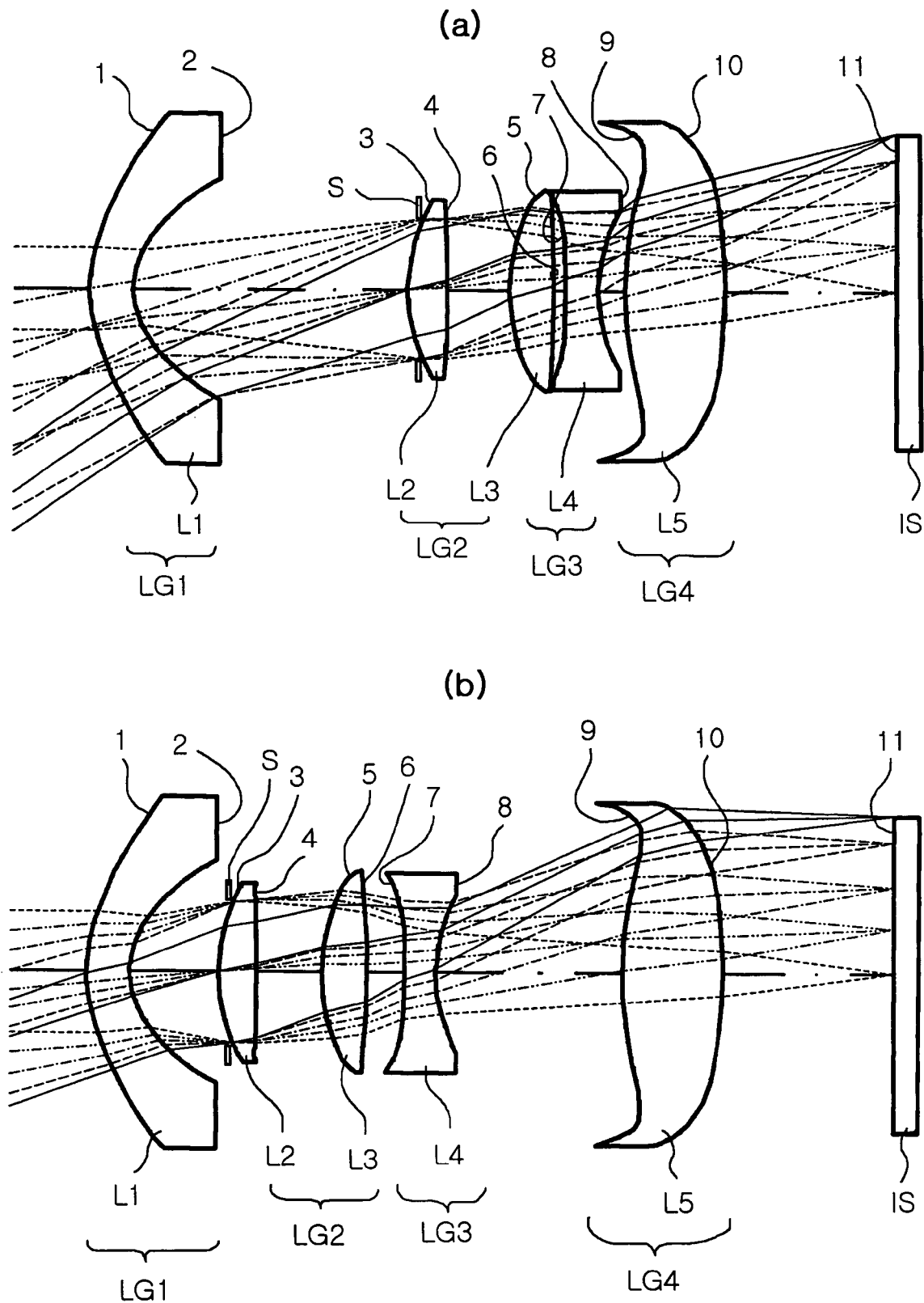
FIG. 4 is a view illustrating a lens construction of an inner zoom lens system according to a second embodiment of the present invention, in which (a) and (b) represent a lens construction at a wide angle end and a lens construction at a telephoto end, respectively.
Figure 5:
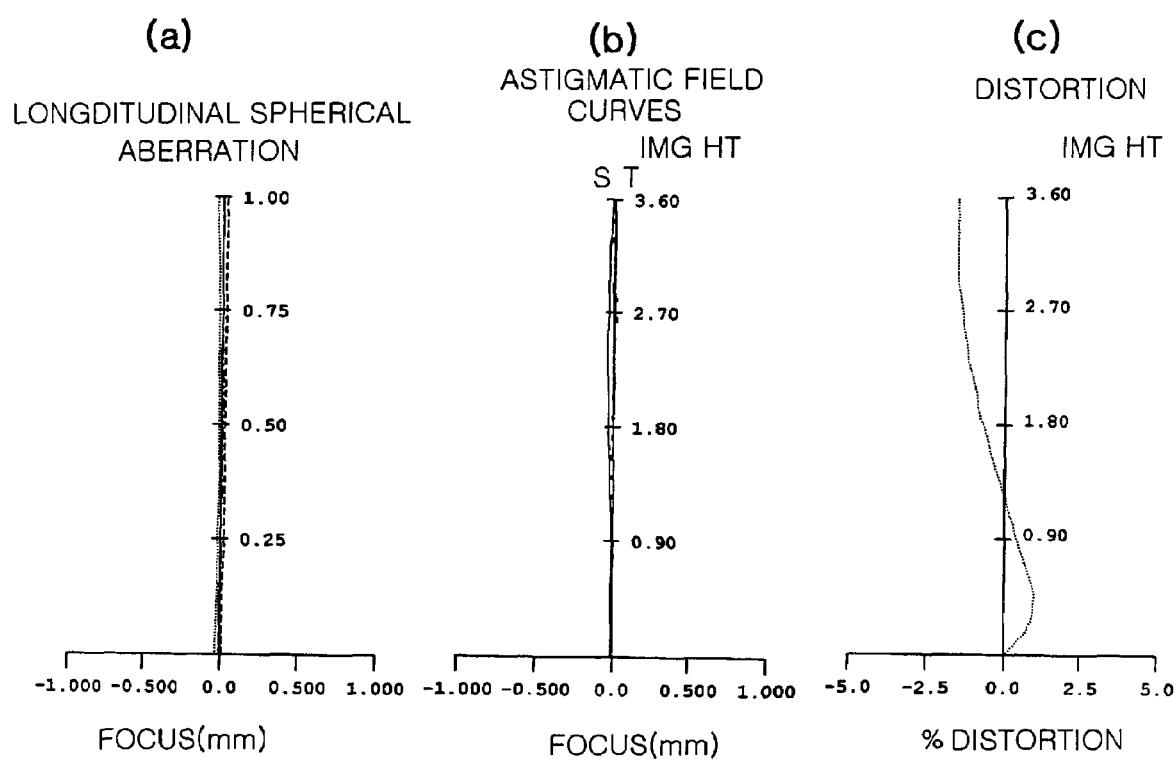
FIG. 5 is a graph explaining aberrations at a wide angle end of the second embodiment shown in FIG. 4, in which (a), (b), and (c) represent a spherical aberration, astigmatism, and distortion, respectively.
Figure 6:
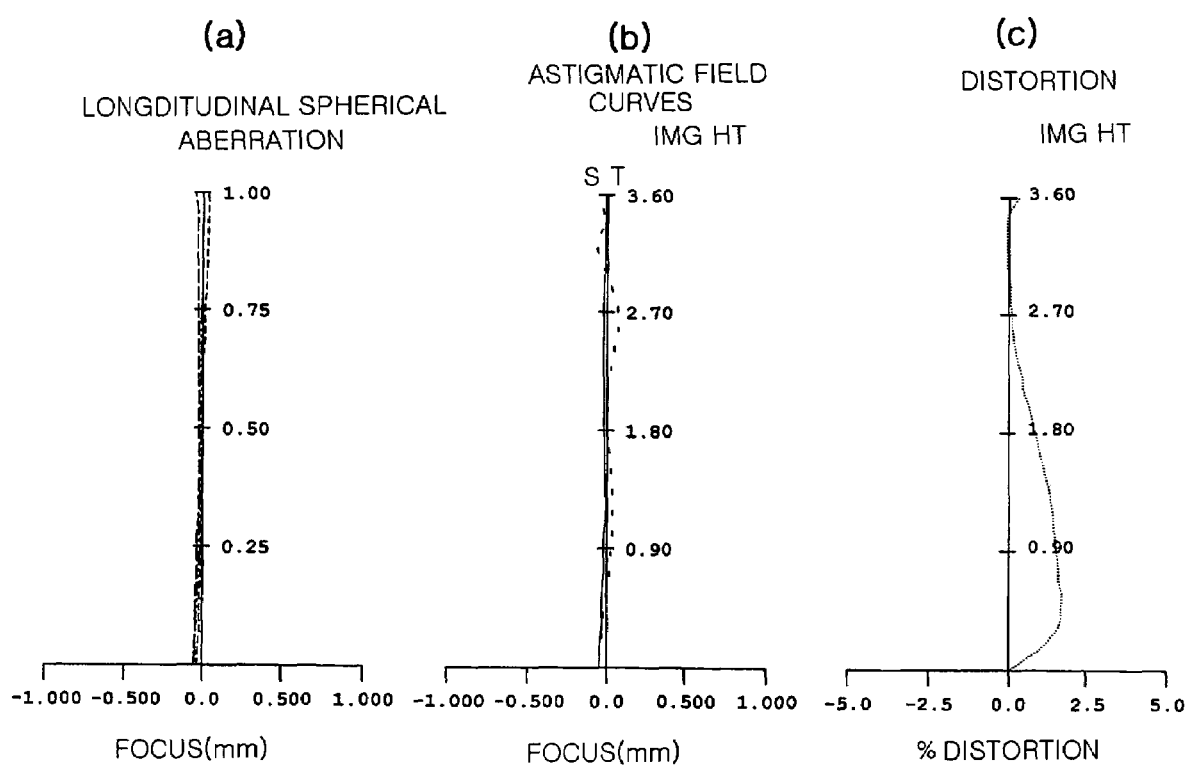
FIG. 6 is a graph explaining aberrations at a telephoto end of the second embodiment shown in FIG. 4, in which (a), (b), and (c) represent a spherical aberration, astigmatism, and distortion, respectively.

Further, FIG. 4(a) is a view of a lens construction illustrating a lens arrangement at a wide angle end in an inner zoom lens system according to the second embodiment of the present invention, FIG. 4(b) is a view of a lens construction illustrating a lens arrangement at a telephoto end, FIG. 5(a) to 5(c) illustrate a spherical aberration, astigmatism, and distortion, respectively, at a wide angel end of the lens system illustrated in Table 4 and FIG. 4. FIG. 6(a) to 6(c) illustrate a spherical aberration, astigmatism, and distortion, respectively, at a telephoto end of the lens system illustrated in Table 4 and FIG. 4.

Referring to FIG. 4, in a zoom lens system according to the second embodiment of the present invention, a first lens group LG1 consists only of a first lens L1 which is a negative meniscus lens convex toward an object side. A second lens group LG2 consists of a second lens L2 that is convex on its both sides and a third lens L3 having plus refractive power. A third lens group LG3 consists only of a fourth lens L4 having minus refractive power. The fourth lens group LG4 consists only of a fifth lens L5 having plus refractive power.

Further, in the following graph illustrating astigmatism, "S", "T" represent sagittal, tangential, respectively.

According to the second embodiment, an effective focal length $f_w$ of the entire lens system at a wide angle end is 5.6 mm and an effective focal length $f_T$ of the entire lens system at a telephoto end is 11.2 mm. An effective focal length $f_I$ of the first lens group LG1 is −8.4 mm, an effective focal length $f_{II}$ of the second lens group LG2 is 3.98 mm, and effective focal length $f_{III}$ of the third lens group LG3 is −4.16 mm, and an effective focal length $f_{IV}$ of the fourth lens group LG4 is 8.94 mm.

Further, F-number $F_{No}$ is 2.8 at a wide angle end, 4 at a telephoto end, and an entire angle of view 2ω is 62° at a wide angle end, 35° at a telephoto end. A total length (TL) from the first lens L1 of the first lens group LG1 to an image plane (IP) is 18.0 mm. A diagonal length of the image sensor (IS) is 7.2 mm.

TABLE 4

| Plane No. | Radius of curvature R (mm) | Plane interval t (mm) | Refractive index $n_d$ | Abbe number $V_d$ | Remark |
|---|---|---|---|---|---|
| *1 | 3.4640 | 1.0000 | 1.529 | 55.4 | 1st lens |
| *2 | 1.8070 | ✕·variable 1 | — | — | |
| *3 | 3.9980 | 0.8517 | 1.529 | 55.4 | 2nd lens |
| *4 | −175.6850 | 1.4272 | — | — | |

TABLE 4-continued

| Plane No. | Radius of curvature R (mm) | Plane interval t (mm) | Refractive index $n_d$ | Abbe number $V_d$ | Remark |
|---|---|---|---|---|---|
| *5 | 3.9350 | 0.9948 | 1.632 | 63.8 | 3rd lens |
| *6 | 14.0980 | ✕·variable 1 | — | — | |
| *7 | 15.1470 | 0.7000 | 1.755 | 27.5 | 4th lens |
| *8 | 3.2270 | ✕·variable 1 | — | — | |
| *9 | 7.3150 | 2.2183 | 1.529 | 55.4 | 5th lens |
| *10 | −16.1690 | 3.8353 | — | — | |
| *11 | ∞ | — | — | — | Image plane |

In Table 4, ✕ represents a refraction plane whose inter-plane interval is varied upon zooming. The inter-plane intervals at a wide angle end and at a telephoto end are given by Table 5 below.

TABLE 5

|  | Wide angle end (mm) | Telephoto end (mm) |
|---|---|---|
| Variable 1 | 6.1005 | 1.9628 |
| Variable 2 | 0.2662 | 0.8336 |
| Variable 3 | 0.6061 | 4.1764 |

In Table 4, ★ represents an aspherical surface and Conic constants K and aspherical coefficients A, B, C, and D by the formula 1 are given by Table 6 as follows.

TABLE 6

| Plane No. | K | A | B | C | D |
|---|---|---|---|---|---|
| 1 | −2.1679E+00 | −1.7586E−03 | 1.7597E−04 | −4.5603E−06 | |
| 2 | −6.7799E−01 | −8.7100E−03 | 5.1138E−04 | −1.0280E−05 | |
| 3 | −1.3540E+00 | 4.2550E−04 | 6.9760E−04 | −2.6578E−04 | 6.3292E−05 |
| 4 | −9.5323E+21 | −6.4053E−03 | 1.1997E−03 | −2.1920E−04 | 3.3195E−05 |
| 5 | −8.2350E−01 | −6.9884E−03 | 1.0031E−03 | −2.7840E−04 | 6.4535E−05 |
| 6 | −4.1537E+30 | −1.3112E−02 | 1.3106E−03 | −1.2836E−04 | 2.0617E−05 |
| 7 | −1.3629E+14 | −1.6120E−02 | 7.7379E−04 | −5.5532E−04 | 1.7648E−04 |
| 8 | −5.3541E−01 | −4.9899E−03 | 6.7982E−04 | −5.1626E−04 | 1.0197E−04 |
| 9 | −4.7603E+00 | −2.7780E−03 | 9.5516E−04 | −1.9856E−04 | 1.8420E−05 |
| 10 | 1.6387E+01 | −3.3350E−03 | 5.9428E−04 | −9.0855E−05 | 6.7617E−06 |

Values of Equations 1 to 6 for the first and the second embodiments are given by Table 7 below.

TABLE 7

|  | First embodiment | Second embodiment |
|---|---|---|
| Equation 1 | 0.876 | 1.5 |
| Equation 2 | 0.395 | 0.711 |
| Equation 3 | 0.210 | 0.743 |
| Equation 4 | 1.018 | 1.596 |
| Equation 5 | 2.5 | 2.5 |
| Equation 6 | 2.0 | 2.0 |

As revealed by Table 7, the first and the second embodiments of the present invention satisfy Equations 1 to 6 and realize a lens system having excellent aberration characteristics as illustrated in FIGS. 2, 3, 5, and 6.

As described above, according to the present invention, it is possible to realize an inner-focus type inner zoom lens system capable of achieving a high resolution, a sufficient zooming performance, and a small size simply using a small lens combination consisting of less than six lenses.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An inner zoom lens system, comprising:
a first, fixed lens group having a minus refractive power;
a second, moving lens group for performing a zooming operation such that an interval between the first lens group and the second lens group is reduced when zooming from a wide angle end to a telephoto end, said second, moving lens group having a plus refractive power;
a third, moving lens group having a minus refractive power and being moveable such that a position of an image plane is corrected depending on the zooming operation of the second lens group; and
a fourth, fixed lens group having a plus refractive power;
wherein the refractive powers of said lens groups satisfy Equations 1 to 4 below:

$$0.5 < |f_I|/f_W < 2.0 \quad \text{Equation 1}$$

$$0.3 < f_{II}/f_W < 1.0 \quad \text{Equation 2}$$

$$0.2 < |f_{III}|/f_W < 1.5 \quad \text{Equation 3}$$

$$0.5 < f_{IV}/f_W < 3.0 \quad \text{Equation 4}$$

where, $f_I$: effective focal length of the first lens group wherein $f_I < 0$;
$f_{II}$: effective focal length of the second lens group;
$f_{III}$: effective focal length of the third lens group wherein $f_{III} < 0$;
$f_{IV}$: effective focal length of the fourth lens group; and
$f_W$: effective focal length of the entire lens system at the wide angle end.

2. The system of claim 1, wherein the entire lens system satisfies Equation 5 below:

$$TL/d < 3.0 \quad \text{Equation 5}$$

where, d: diagonal length of an image sensor that corresponds to the image plane; and
TL: distance, as measured in an optical axis direction of the entire lens system, from a refractive plane at an object side of the first lens group up to the image plane.

3. The system of claim 2, wherein effective focal lengths of the entire lens system at the wide angle end and at the telephoto end satisfy Equation 6 below:

$$f_T/f_W \geq 2.0 \quad \text{Equation 6}$$

where, $f_W$: effective focal length of the entire lens system at the wide angle end; and
$f_T$: effective focal length of the entire lens system at the telephoto end.

4. The system of claim 1, wherein effective focal lengths of the entire lens system at the wide angle end and at the telephoto end satisfy Equation 6 below:

$$f_T/f_W \geq 2.0 \quad \text{Equation 6}$$

where, $f_W$: effective focal length of the entire lens system at the wide angle end; and
$f_T$: effective focal length of the entire lens system at the telephoto end.

5. The system of claim 1, wherein the first to fourth lens groups use a lens combination consisting of four to six lenses in total.

6. The system of claim 1, wherein a lens in the third lens group is made of a material having a refractive index of 1.7 or more and an abbe number of 30 or less.

7. An inner zoom lens system, comprising:

a first, fixed lens group having a minus refractive power;

a second, moving lens group for performing a zooming operation such that an interval between the first lens group and the second lens group is reduced when zooming from a wide angle end to a telephoto end, said second, moving lens group having a plus refractive power;

a third, moving lens group having a minus refractive power and being moveable such that a position of an image plane is corrected depending on the zooming operation of the second lens group; and a fourth, fixed lens group having a plus refractive power;

wherein the first to fourth lens groups use a lens combination consisting of four to six lenses in total.

8. An inner zoom lens system, comprising:

a first, fixed lens group having a minus refractive power;

a second, moving lens group for performing a zooming operation such that an interval between the first lens group and the second lens group is reduced when zooming from a wide angle end to a telephoto end, said second, moving lens group having a plus refractive power;

a third, moving lens group having only one lens of a minus refractive power and being moveable such that a position of an image plane is corrected depending on the zooming operation of the second lens group;

a fourth, fixed lens group having only one lens of a plus refractive power; and an image sensor for sensing a formed image from the fourth lens group, a total lens combination in the first to fourth lens groups being six or less.

9. The system of claim 8, wherein the refractive powers of said lens groups satisfy Equations 1 to 4 below:

$$0.5 < |f_I|/f_W < 2.0 \qquad \text{Equation 1}$$

$$0.3 < f_{II}/f_W < 1.0 \qquad \text{Equation 2}$$

$$0.2 < |f_{III}|/f_W < 1.5 \qquad \text{Equation 3}$$

$$0.5 < f_{IV}/f_W < 3.0 \qquad \text{Equation 4}$$

where, $f_I$: effective focal length of the first lens group wherein $f_I < 0$;

$f_{II}$: effective focal length of the second lens group;

$f_{III}$: effective focal length of the third lens group wherein $f_{III} < 0$;

$f_{IV}$: effective focal length of the fourth lens group; and $f_W$: effective focal length of the entire lens system at the wide angle end.

10. The system of claim 9, wherein the entire lens system further satisfies Equation 5 and Equation 6 below:

$$TL/d < 3.0 \qquad \text{Equation 5}$$

$$f_T/f_W \geq 2.0 \qquad \text{Equation 6}$$

where, d: diagonal length of the image sensor that corresponds to the image plane;

TL: distance, as measured in an optical axis direction of the entire lens system, from a refractive plane at an object side of the first lens group up to the image plane;

$f_W$: effective focal length of the entire lens system at the wide angle end; and $f_T$: effective focal length of the entire lens system at the telephoto end.

* * * * *